United States Patent [19]

Moldrup

[11] 4,347,944
[45] Sep. 7, 1982

[54] COVER FOR A CYLINDER-SHAPED PRESSURE CONTAINER

[76] Inventor: Niels Moldrup, Rytterhegnet 9, 3400 Allerod, Denmark

[21] Appl. No.: 198,146
[22] PCT Filed: Feb. 22, 1979
[86] PCT No.: PCT/DK79/00005
§ 371 Date: Oct. 17, 1980
§ 102(e) Date: Oct. 17, 1980
[87] PCT Pub. No.: WO80/01831
PCT Pub. Date: Sep. 4, 1980
[51] Int. Cl.³ .............................................. B65D 45/32
[52] U.S. Cl. ............................. 220/320; 292/256.65; 292/256.69
[58] Field of Search ............... 220/319, 320, 211, 316, 220/344; 292/256.6, 256.63, 256.65, 256.67, 256.69; 285/410

[56] References Cited

U.S. PATENT DOCUMENTS

| | | | |
|---|---|---|---|
| 1,958,923 | 9/1923 | Mohler | 220/344 |
| 2,271,855 | 2/1942 | Cleveland et al. | 220/320 X |
| 2,541,205 | 2/1951 | Christophersen | 285/410 |
| 3,029,724 | 4/1962 | Lee | 220/320 X |
| 3,144,165 | 8/1964 | Pegon et al. | 220/211 |
| 3,310,329 | 1/1966 | Luker | 292/256.69 |

FOREIGN PATENT DOCUMENTS 2142415 8/1971 Fed. Rep. of Germany .
2355779 5/1975 Fed. Rep. of Germany ...... 220/320

*Primary Examiner*—George T. Hall
*Attorney, Agent, or Firm*—Nolte and Nolte

[57] ABSTRACT

Cover for a cylinder-shaped pressure container such as a vacuum impregnation container or an autoclave which at the mouth edge has members for holding a tight fitting closure member against the mouth edge which members contrary to previously known and complicated members can be manufactured by means of generally known working processes and machine tools. The mouth edge of the container (1) and the closure member (3) both have a radially outwards directed annular flange (2,4) which flanges have cooperating contact faces (5) and each a sloping surface, whereby the width of the two flange members (2,4) is decreasing towards the outer edge. The cover further comprises a retaining ring (6) which is placed close to the flange members (2,4) and which is ended up by two free ends (8). The retaining ring (6) has a slot (7) which is open towards the center and corresponding to the cross section of the flange members (2,4), and the circumference of the retaining ring (6) is similar to the outer circumference of the flanges (2,4) so that the free ends of the ring (6) can be pulled towards each other, when the flange members (2,4) are assumed in the slot (7) of the ring (6). The free ends (8) of the retaining ring (6) can be connected to driving means (9) of a hydraulic type for the closing of the retaining ring (6) around the flange members (2,4).

7 Claims, 3 Drawing Figures

COVER FOR A CYLINDER-SHAPED PRESSURE CONTAINER

The present invention relates to a cover for a cylinder-shaped pressure container or an autoclave which at the mouth edge has members for holding a tight closing closure member against the mouth edge.

Pressure containers often work by a pressure of up to 15 ato. The high pressure makes heavy demands on the cover of the container. It is, of course, possible to make covers and closing mechanisms which can stand the high working pressures in the container. However, it is also necessary to make the cover and the closing mechanism in such a way that a suitably simple operation is achieved when using pressure containers. Previously used covers are either provided with bayonet closing mechanisms or locking rings consisting of two semi-circular locking rings which are clamped around a collar on the container and a similar collar on the cover. The bayonet closing mechanism is made out of a number of radially outwardly arranged pins on the cover, which pins cooperate with incised, sloping slots at the mouth edge of the container. On account of the heavy demands which for security reasons are made on the cover, the dimensions are made in a way which requires special tools and expertise at the manufacturing. Therefore, there are only few firms in Europe which can take up such a manufacturing. Further the operation of the cover requires much work and time because of the many bolts which are to be screwed on and off the pins in the bayonet closing mechanism.

For smaller pressure containers it may be possible to use the closing mechanism known from U.S. Pat. No. 1,958,923 consisting of two semi-circular locking rings which cooperate with collars or flanges on the cover and container mouth. This closing mechanism is, however, rather complicated to manufacture in the required dimensions.

The object of the present invention is to indicate a cover of the type mentioned in the introduction which can overcome the drawbacks of the previously known covers, i.e. that the cover can be made by usual working processes and machine tools.

This object is achieved by means of a cover which is characterized in that the mouth edge of the container and the closure member both have a radially outwards directed annular flange, the flanges having cooperating contact faces and each a sloping surface, whereby the width of the two flange members is decreasing towards the outer edge, the cover further comprising a retaining ring which is placed close to the flange members and which is ended up by two free ends, and that the retaining ring has a slot which is open towards the centre and corresponding to the cross section of the flange members, and where the circumference of the retaining ring is smaller than the outer circumference of the flange members so that the free ends of the ring can be pulled towards each other, when the flange members are assumed in the slot of the ring. The retaining ring consists of a coherent circular piece which facilitates the manufacturing of the locking ring and the operation of this after the mounting on the pressure container.

The cover may be characterized in that the free ends of the retaining ring can be removed from each other so that the inner diameter of the ring is at least similar to the outer diameter of the flange members for liberation of the closure member and are pulled towards each other for holding the closure member by means of driving means. The use of driving means for activating the retaining ring facilitates the operation of the cover and the security of using the cover according to the invention is increased.

The cover may further be characterized in that the driving means are of a hydraulic type. The application of hydraulic driving means is particularly advantageous.

The invention will be described further with reference to the drawing, where

Figure 1:
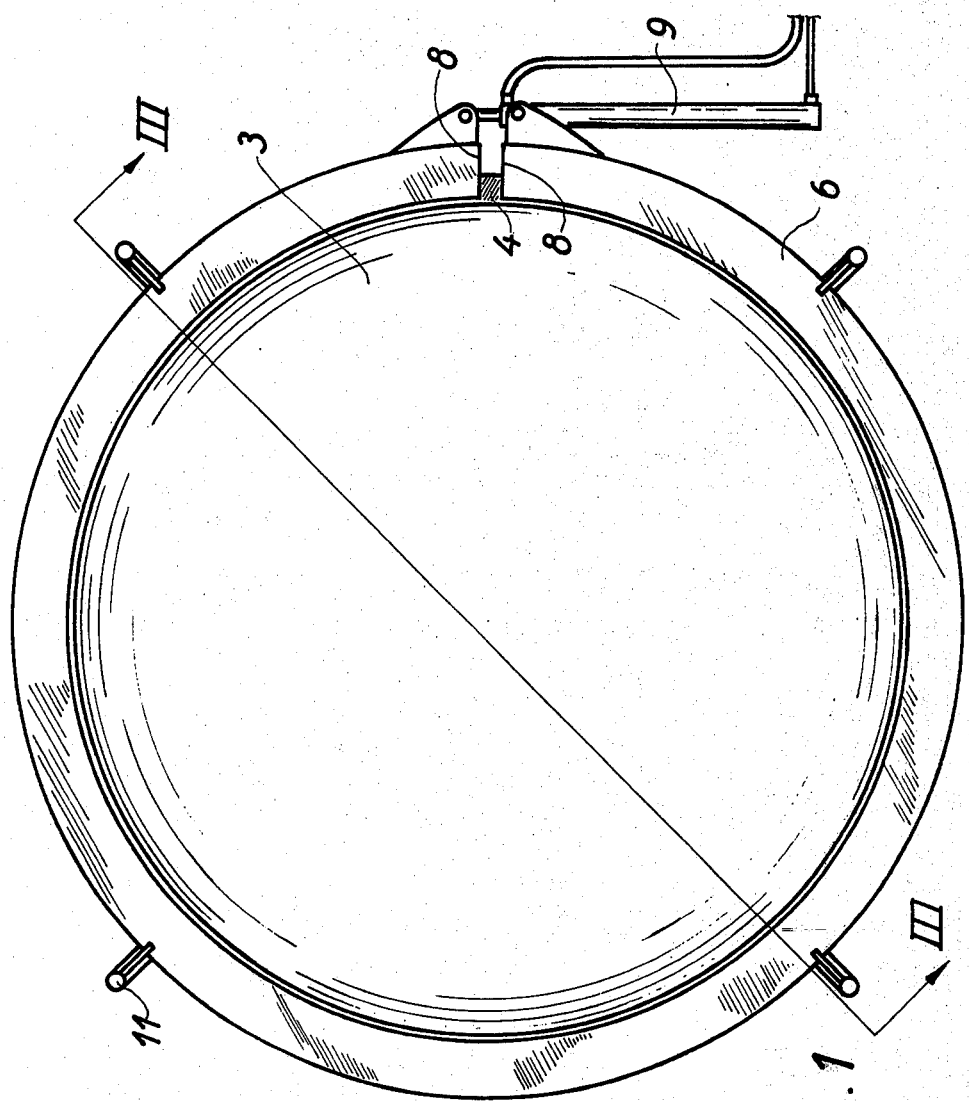
FIG. 1 shows a cover according to the invention seen from the end.
Figure 2:
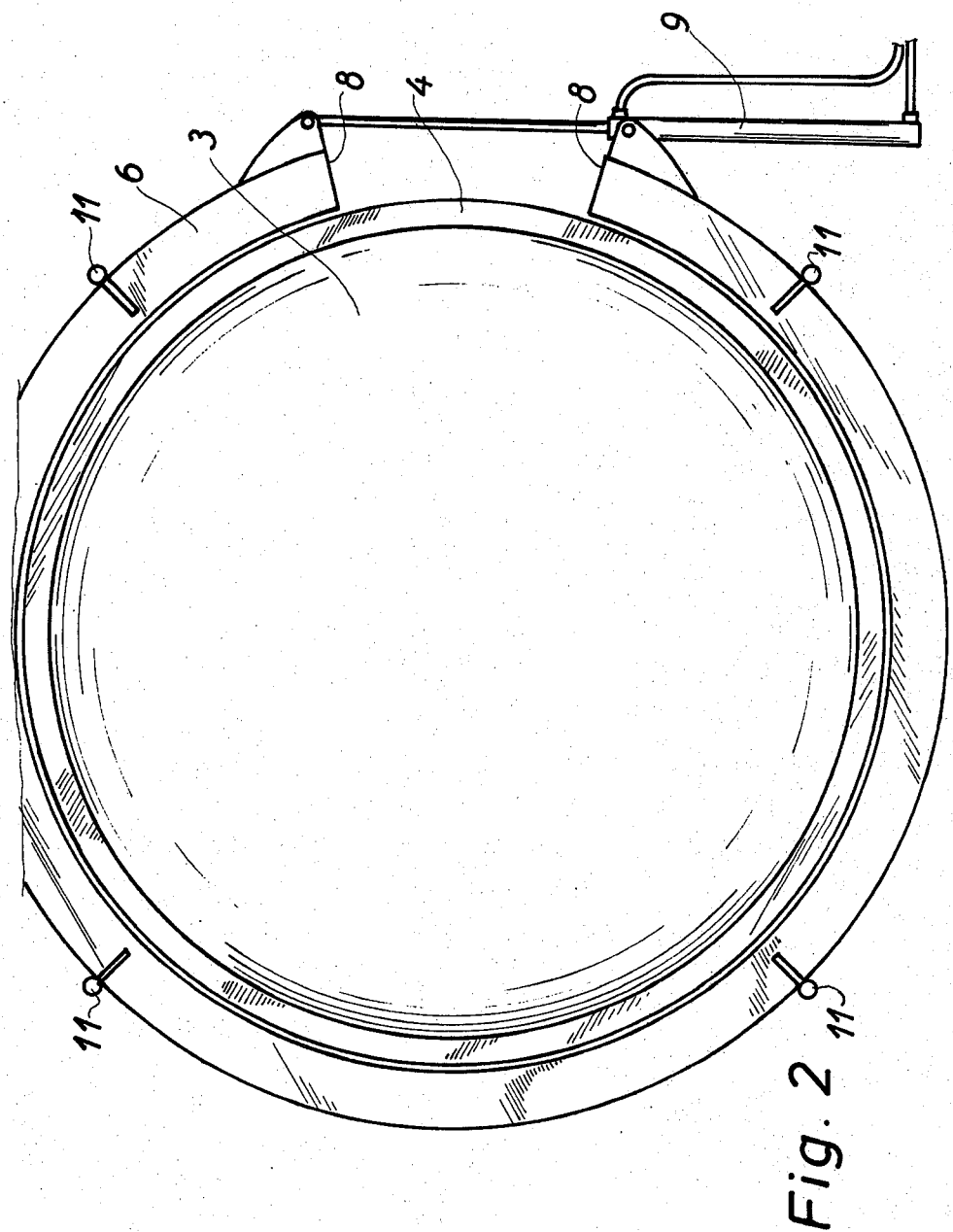
FIG. 2 shows the same, but with the retaining ring in an open position.

FIGS. 1 and 2 shows a cover 3 with a circumferential flange member 4 and a retaining ring 6 the two free ends 8 of which are connected by means of a hydraulic cylinder 9. The retaining ring 6 is fastened to the container in the open position by means of four ring pilots 11.

Figure 3:
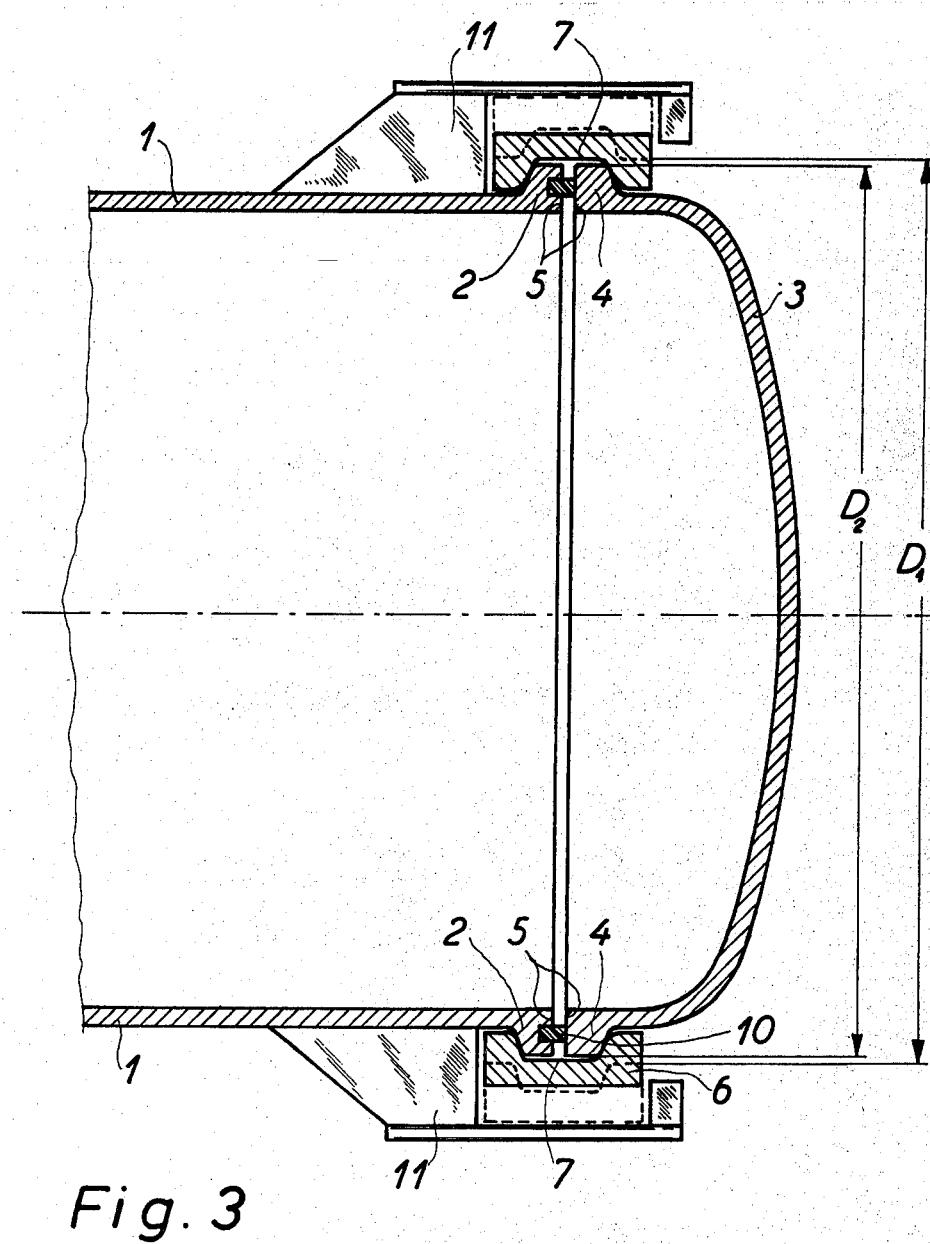
FIG. 3 shows the cover seen in a section along the line III—III in FIG. 1.

FIG. 3 shows the cover 3 seen in a section along the line III—III in FIG. 1. The retaining ring 6 is provided with an inner slot 7 the shape of which corresponds to the outer outline of the two flange members 2 and 4, when the cover 3 is placed on the mouth edge of the container 1. In the flange member 2 along the mouth edge of the container 1 a packing 10 is inserted in a circumferential groove. The ring pilots 11 are shaped in such a way that the inner diameter $D_1$ of the retaining ring 6 in the open position is bigger than or at least similar to the outer diameter $D_2$ of the flange member 2 and 4.

The operation of the cover 3 takes place in the following way. The cover 3, which is fastened to the container 1 by means of generally known hinge devices (not shown), is during the closing swung towards the mouth edge, whereafter the retaining ring 6 by means of the hydraulic cylinder 9 is pulled down over the two flange members 2 and 4 which are thus further pressed against each other on account of the shape of the cross section of the flange members 2 and 4 and the slot 7 in the retaining ring 6. When opening the cover 3 the free ends 8 of the retaining ring 6 are pulled away from each other, whereby the retaining ring 6 is first supported by the two lowest ring pilots 11, and is then pressed up against the two upper pilots 11, so that the retaining ring 6 is clamped between the four ring pilots 11. The cover 3 can then be swung out from the mouth edge of the container 1.

In order to obtain an extra security, it is possible to place, for example, a steel wire provided with an eye at each end around the closed retaining ring 6 and secured by means of, for example, a shackle.

These closing and clamping means can also with great advantage be used for assembling objects which are each provided with an annular flange. By using a retaining ring over such annular flange members, the objects can be assembled and parted as required. An example of such a use is assemblies of tube pieces into pipe lines, assemblies of container parts, containers, etc.

I claim:

1. Cover for a cylinder-shaped pressure container such as a vacuum impregnation container or an autoclave which at the mouth edge has members for holding a tight fitting closure member against the mouth edge, characterized in that the mouth edge of the container (1) and the closure member (3) both have a radially outwards directed annular flange (2,4), the flanges having cooperating contact faces (5) and each a sloping surface, whereby the width of the two flange members (2,4) is decreasing towards the outer edge, the cover further comprising a one-piece, unitary, circular, retaining ring (6) which is placed close to the flange members (2,4) and which is ended up by two free ends (8), and that the retaining ring (6) has a slot (7) which is open towards the centre and corresponding to the cross section of the flange members (2,4), said width of said two flange members being at least equal to the depth of said slot, and where the circumference of the retaining ring (6) is smaller than the outer circumference of the flanges (2,4), so that the free ends (8) of the one-piece, unitary, circular, retaining ring (6) can be pulled towards each other to a closed position, when the flange members (2,4) are assumed in the slot (7) of the ring (6).

2. Cover according to claim 1, characterized in that said two free ends (8) of the one-piece, unitary, circular, retaining ring (6) can be removed from each other to an open position so that the inner diameter ($D_1$) of the ring (6) is at least similar to the outer diameter ($D_2$) of the two flange members (2,4) for the liberation of the closure member (3) and are pulled towards each other to said closed position for holding the closure member (3) by means of a driving means (9).

3. Cover according to claim 2, characterized in that the driving means (9) is of a hydraulic type, said driving means being operably connected to said two free ends of said one-piece, unitary, circular, retaining ring.

4. The cover of claim 1, further comprising pilot means affixed to the circumference of the container adjacent said one-piece, unitary, circular, retaining ring for guiding and aligning said ring relative to said annular flanges.

5. The cover of claim 4, wherein said pilot means include means for limiting the circumference of said one-piece, unitary, circular, retaining ring in an open position when the ends of said ring are not pulled toward each other.

6. The cover of claim 1, further comprising pilot means affixed to the container for supporting said one-piece, unitary, circular, retaining ring proximate said flanges and including means for limiting the circumference of said circular, retaining ring in an open position, wherein said free ends of said retaining ring are not pulled toward each other, to a diameter greater than the diameter of said annular flanges.

7. The cover of claim 6, wherein said pilot means include means for fastening said one-piece, unitary, circular, retaining ring to said container when said ring is in an open position.

* * * * *